Patented Feb. 25, 1930

1,748,051

UNITED STATES PATENT OFFICE.

PAUL D. BARTON, OF LOS ANGELES, CALIFORNIA, ASSIGNOR TO UNITED OIL COMPANY, OF LOS ANGELES, CALIFORNIA, A CORPORATION OF CALIFORNIA

ABSORPTION PROCESS

No Drawing.     Application filed May 4, 1926. Serial No. 106,755.

This invention has to do with absorption processes, such as are used for the absorption of liquids from gas in which the liquid may be carried either in the vapor phase or as liquid. Although the invention is not at all to be considered as limited to the particular usages of which I speak, it can best be explained and most readily understood from a consideration of it as applied to the absorption of gasoline carried in vaporous or mist form in natural gas.

The process of absorbing gasoline from natural gas has been very widely practiced of late years, the most universal method involving passage of the loaded gas through an absorbing oil, causing intimate admixture and contact of the gas with the oil so that as far as possible the carried gasoline comes into contact with the absorbing oil and is taken up by it. So far as I am aware it has always been the practice to use a relatively heavy absorbing oil, and to separate the absorbed gasoline from the oil by fractional distillation. The entire liquid mixture is heated up to a temperature somewhat above that of gasoline vaporization, but well under the vaporization point of the absorbing oil; and the gasoline vapors taken off and condensed. But before the absorbing oil can be put back into the absorber to take up more gasoline, it must be cooled; and although this cooling is at least in part effected by heat transfer, there is always a considerable loss of heat. And the handling and heating of the liquids requires apparatus that adds to the expense of the plant.

It is the general object of this invention to provide a method of absorption, or more properly speaking, a method of separating liquids from the gases in which they are carried as vapor or as liquid suspension, that admits of a very much simplified procedure and does away with the necessity of a great deal of the apparatus used in absorption processes at present. The underlying feature of my new process is the use of an absorbing medium of such a nature that gasoline or other absorbed liquid can be easily separated out without the necessity of distillation. By doing away with distillation, the alternate heating and cooling of the absorbing liquid in each cycle of operations is entirely obviated. In fact, as will readily be seen from the following detailed description, my process requires the input of very little energy in any form.

The absorbing medium which I preferably choose for the purpose of my process (as applied specifically to gasoline and natural gas) consists of water and a substance capable of suspension in the water, preferably forming a colloid suspension, and capable of adsorbing the gasoline to be extracted from the gas. I choose water as the liquid ingredient of the absorbing medium because it is the most readily convenient of all liquids that are immiscible with gasoline. Other liquids may, of course, be used; the underlying requirement being that whatever the liquid may be, it shall be immiscible with the liquid to be extracted from the gas and shall be capable of suspending a substance, such as a colloid, that has the property of promoting the formation of a temporary emulsion of the liquid that is to be extracted from the gas with the carrier liquid. Thus, without necessarily limiting the invention to the particular substances named, I may prefer to use as the absorbing medium a suspension of colloidal clay in water; or a suspension in water of a soap or fatty acid. Also under certain conditions of pressure and temperature, water alone may take up the gasoline fractions from the gas when brought into intimate contact, forming a temporary emulsion.

The absorbing medium and gasoline laden gas are brought into intimate contact with each other in any of the well known manners. For this purpose any of the well known absorbing towers or other devices may be used. Their function generally is to pass the laden gas through the absorbing medium or the absorbing medium through the laden gas, in such a manner that the gas is finely distributed and intimately admixed, and brought into intimate contact with the absorbing medium, so that all particles of carried gasoline are brought into contact with that medium. A common form of such absorbing apparatus is one in which the gas is bubbled up through the medium, the gas being fed in at the bottom of the absorbing tower and being drawn off at the top, the fresh absorbing medium being fed in at the top of the tower and drawn off at the bottom laden with gasoline.

In any absorbing apparatus the liquid absorbing medium is kept in more or less constant agitation by passage of gas therethrough, and this constant agitation will, in my process, serve to keep the colloids in suspension during the action of extracting the gasoline. The agitation also aids in the formation of the temporary emulsion or suspension. The form in which the gasoline is thus held by the absorbing medium is not in the form of solution, as the water is immiscible with the gasoline. Neither is it in the form of a permanent emulsion. It would seen to be in the form of finely divided globules of gasoline attached to the adsorbing colloid and thereby held in fine globular form in the colloid suspension in water, the whole mixture being in emulsion form, but impermanent. Such an impermanent emulsion can easily be separated by settling.

The gasoline laden absorbing medium when it is drawn from the absorbing apparatus is then simply run into settling vats or tanks where it may stand for some length of time. Upon standing, the gasoline stratifies from the absorbing medium, the gasoline rising to the top, leaving the water and the colloid beneath. During this settling operation the colloid may tend to settle in the water (depending upon what substance is used in the water) but upon withdrawal of the absorbing medium from the settling tank it is easily mixed again before putting it back into the absorbing tower.

The process I have described requires no application of heat in the average case. The temperature of operation in the absorbing tower must be kept somewhere between the freezing temperature of water or of the colloid solution and the vaporizing temperature of the gasoline or other liquid being absorbed. Thus in an ordinary case and acting substantially at atmospheric pressure, the operating temperature of absorption will be maintained somewhere between 32° F., and about 80° F. Natural gas as it comes from wells most commonly has a temperature of about 80° F.; and it is only necessary to cool the laden gas somewhat before putting it into the absorbing tower. This may in many cases easily be done by partially releasing the gas pressure, as the gas coming from wells in many cases may be under a pressure substantially higher than that desired in the absorbing operation. Thus in many instances it is only necessary to control the temperature of gas without any necessity of taking away heat from the gas or adding heat to it. In instances where it may be necessary to positively take heat away from the gas, this may be done by merely allowing it to cool by radiation to atmosphere before putting it into the absorbing tower.

The only energy requirements of the process are for pumping the absorbing medium to and from the absorbing tower and the settling tanks.

Although I have described my process specifically as one for the separation of a liquid from a gas, the invention is not necessarily limited thereto. It will readily be seen, for instance, that a mixture of liquids may be separated by the same general procedure, using an absorbing liquid immiscible with either mixed liquid, and an adsorbing substance capable of selectively adsorbing one liquid and not the other. In fact, in viewing the process as described to be the separation of one fluid from another fluid, it will be seen that there is a mixture of fluids; the absorbing medium consists of a fluid immiscible with either fluid of the mixture, and an adsorbing substance capable of selectively adsorbing one fluid and not the other.

I claim:

1. A method of separating two mixed fluids, that includes contacting the mixture with an absorbing medium consisting of a fluid immiscible with both mixed fluids and a substance capable of adsorbing selectively one of the mixed fluids, thereby causing the last mentioned fluid to be held in the absorbing medium; and then separating the adsorbed fluid from the absorbing medium.

2. A method of separating a liquid from a gas in which it is carried in suspension or as vapor, that includes contacting the laden gas with an absorbing medium consisting of a liquid immiscible with the gas carried liquid and a substance capable of adsorbing the gas carried liquid, thereby causing the gas carried liquid to be held in the absorbing medium by adsorption to said substance; and then separating the gas carried liquid from the absorbing medium.

3. A method of separating a liquid from a gas in which it is carried in suspension or as vapor, that consists in contacting the liquid laden gas with an absorbing medium comprising a colloid solution, said solution being composed of a liquid immiscible with gas carried liquid, and a colloid capable of adsorbing the gas carried liquid, whereby the gas carried liquid is held in the absorbing medium by adsorption to the colloid; and then separating the gas carried liquid from the absorbing medium.

4. A process of separating gasoline from natural gas, that includes contacting the gasoline laden gas intimately with a colloid solution comprised of water and a colloid capable of adsorbing the gasoline, whereby the gasoline is held in the colloid solution by adsorption to the colloid; then separating the gasoline from the colloid solution by stratification.

5. The process of separating two mixed fluids, that includes contacting the mixture with an absorbing medium capable of forming an emulsion selectively with one of the mixed fluids, causing the formation of such emulsion, by means of an adsorbent capable of selectively adsorbing said one of the mixed fluids, and then separating the constituents of the emulsion.

In witness that I claim the foregoing I have hereunto subscribed my name this 9th day of April, 1926.

PAUL D. BARTON.